(12) United States Patent
Lai et al.

(10) Patent No.: US 7,016,486 B2
(45) Date of Patent: Mar. 21, 2006

(54) METHOD FOR AUTOMATICALLY SWITCHING TELEPHONE SYSTEM TO AN ON-HOOK STATE

(75) Inventors: Chengshing Lai, Taipei (TW); Qiang Fan, Nanking (CN)

(73) Assignee: Inventec Appliances Corp., Taipei (TW)

( * ) Notice: Subject to any disclaimer, the term of this patent is extended or adjusted under 35 U.S.C. 154(b) by 8 days.

(21) Appl. No.: 10/709,721

(22) Filed: May 25, 2004

(65) Prior Publication Data
US 2004/0264682 A1    Dec. 30, 2004

(30) Foreign Application Priority Data
Jun. 25, 2003   (TW) ............................... 92117235 A

(51) Int. Cl.
*H04M 3/00* (2006.01)
(52) U.S. Cl. .................................. 379/377; 379/373.02
(58) Field of Classification Search .......... 379/373.02, 379/377
See application file for complete search history.

(56) References Cited

U.S. PATENT DOCUMENTS

| | | | | |
|---|---|---|---|---|
| 4,922,529 A * | 5/1990 | Kiel | ............................ | 379/377 |
| 5,592,529 A * | 1/1997 | Linsker | ................... | 379/32.04 |
| 5,606,593 A * | 2/1997 | Smith | ......................... | 379/33 |
| 5,612,977 A * | 3/1997 | Ogoro | ....................... | 375/344 |
| 5,923,748 A * | 7/1999 | Hwang | ....................... | 379/377 |
| 6,744,873 B1 * | 6/2004 | McCracken et al. | ........ | 379/377 |

\* cited by examiner

Primary Examiner—Jefferey F. Harold
(74) Attorney, Agent, or Firm—Jiang Chyun IP Office

(57) ABSTRACT

A method of automatically switching in an on-hook state suitable for a telephone system is provided. The method automatically switches a spring circuit from an off-hook state to the on-hook state when the telephone system operates in an abnormal use state for a unreasonably long period of time. Therefore, the telephone system can be switched back to the on-hook state when the mouthpiece is unintentionally off the hook so the missing of the phone call can be effectively avoided.

5 Claims, 3 Drawing Sheets

METHOD FOR AUTOMATICALLY SWITCHING TELEPHONE SYSTEM TO AN ON-HOOK STATE

BACKGROUND OF INVENTION

1. Field of the Invention

This invention generally relates to a telephone system, and more particularly to a method of automatically switching telephone system to an on-hook state by automatically switching the spring circuit to the on-hook state when the spring circuit of the telephone system is maintained in the off-hook state for an unreasonably long time.

2. Description of Related Art

In the modern times, the communication devices become indispensable for people to communicate with each other. In our daily life or during the working time, the telephone is the most common telecommunication device. Generally, a telephone includes a mechanical cross spring and a control circuit (hereinafter spring circuit) corresponding to the mouthpiece of the telephone to determine whether the telephone is in the on-hook or off-hook state.

For example, when the user is going to make a phone call, he/she will pick up the mouthpiece so that the spring circuit is in the off-hook state and thus turns on the communication circuit. On the other hand, when the user is going to finish the call, he/she will hang up the mouthpiece so that the spring circuit is in the on-hook state and thus turns off the communication circuit.

It should be noted that when the spring circuit is in the off-hook state, the telephone cannot receive the phone call. If the user does not hang up the mouthpiece properly, or the children pick up the mouthpiece just for fun, the spring circuit will be always in the off-hook state, and therefore the telephone cannot receive the phone call and the user might miss an important phone call.

SUMMARY OF INVENTION

Accordingly, the present invention is directed to a method of automatically switching a telephone system to an on-hook state by automatically switching the spring circuit to the on-hook state when the spring circuit of the telephone system kept in the off-hook state for an unreasonably long time.

According to an embodiment of the present invention, the telephone system is monitored to determine whether the telephone system operates in a normal use state; and the spring circuit is switched to the on-hook state if it is determined that the telephone system is under an abnormal use state.

In an embodiment of the present invention, the the spring circuit is monitored to determine whether the spring circuit is in the off-hook state, and the spring circuit switched to the on-hook state only when the spring circuit is in the off-hook state.

In an embodiment of the present invention, the the spring circuit is switched to the on-hook state only when the telephone system is being operated under an abnormal use state for a predetermined time.

In light of the above, in the method of automatically switching the telephone system to an on-hook state according to an embodiment of the present invention, the spring circuit is automatically switched to the on-hook state when the spring circuit of the telephone system is in the off-hook state for an unreasonably long time. Thus, the spring circuit can be automatically switched to the on-hook state if the telephone does not operate in the normal use state for a predetermined time. Therefore, the telephone can be automatically switched back to the on-hook state so that the phenomenon of missing the phone call when the mouthpiece is unintentionally off the hook can be avoided.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
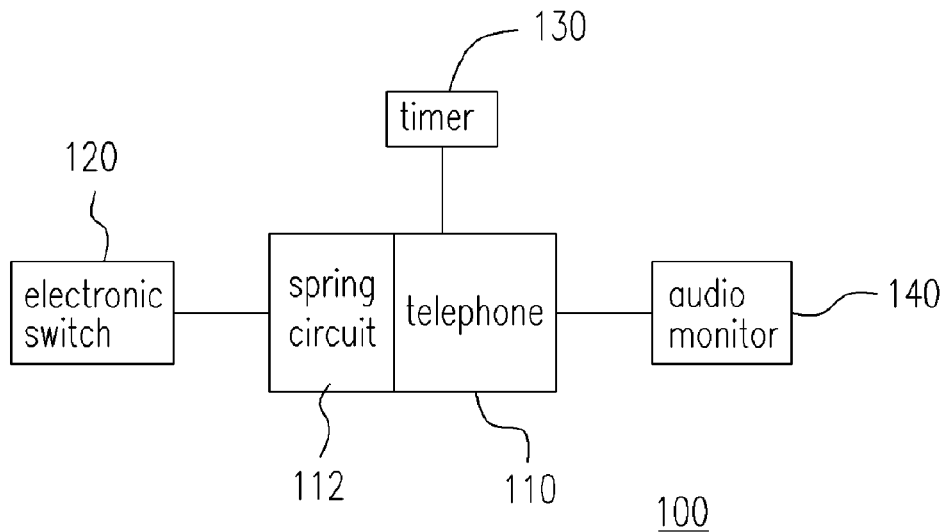
FIG. 1 is a system diagram of an automatic on-hook telephone system in accordance with an embodiment of the present invention.

FIG. 1 is a system diagram of an automatic on-hook telephone system in accordance with an embodiment of the present invention. The telephone system 100 includes a telephone 110, an electronic switch 120, a timer 130 and an audio monitor 140. The telephone 110 includes a spring circuit 112. The spring circuit 112 comprises a mechanical cross spring and a control circuit that are connected with each other. The audio monitor 140 is coupled to the telephone 110 for monitoring the telephone system to determine whether the telephone system operates in a normal use state. The timer 130 is coupled to the telephone 110 for counting the normal use time of the telephone. The electronic switch 120 is coupled to the telephone 110 for switching the spring circuit 112 from the off-hook state to the on-hook state.

Figure 2:
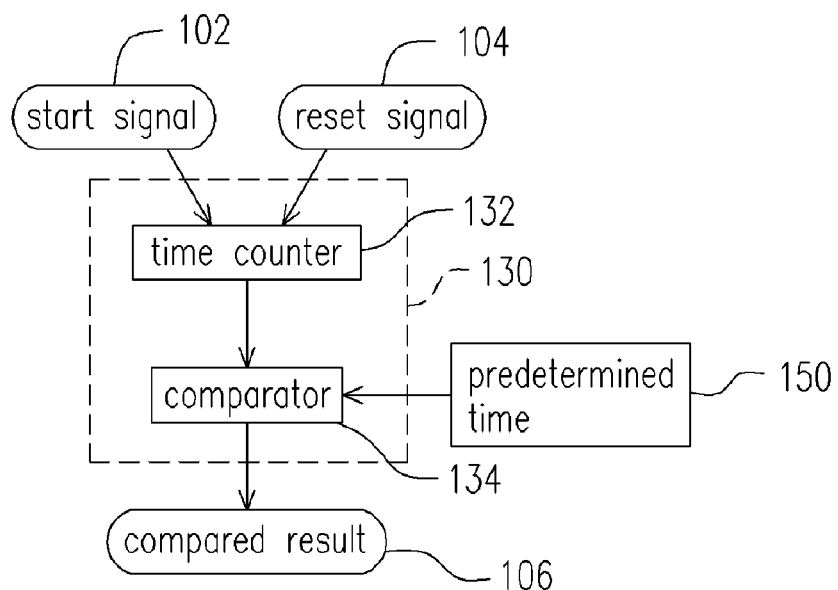
FIG. 2 is a block diagram of a timer in accordance with an embodiment of the present invention.

FIG. 2 is a block diagram of the timer in accordance with an embodiment of the present invention. The timer 130 includes a time counter 132 and a comparator 134. When a start signal 102 is inputted to the time counter 132 of the timer 130, the time counter 132 start to count the in-use time. The time counted by the time counter 132 is sent to the comparator 134 to compare with a predetermined time 150 and the result 106 resulting from the comparison is outputted. If the in-use time is not smaller than the predetermined time 150, the in-use time is continuously accumulated. If the in-use time is larger than the predetermined time 150, the timer 130 generates a control signal. If the timer 130 receives a reset signal 104, the time counter 132 will reset the in-use time to zero and restart to count the in-use time.

Figure 3:
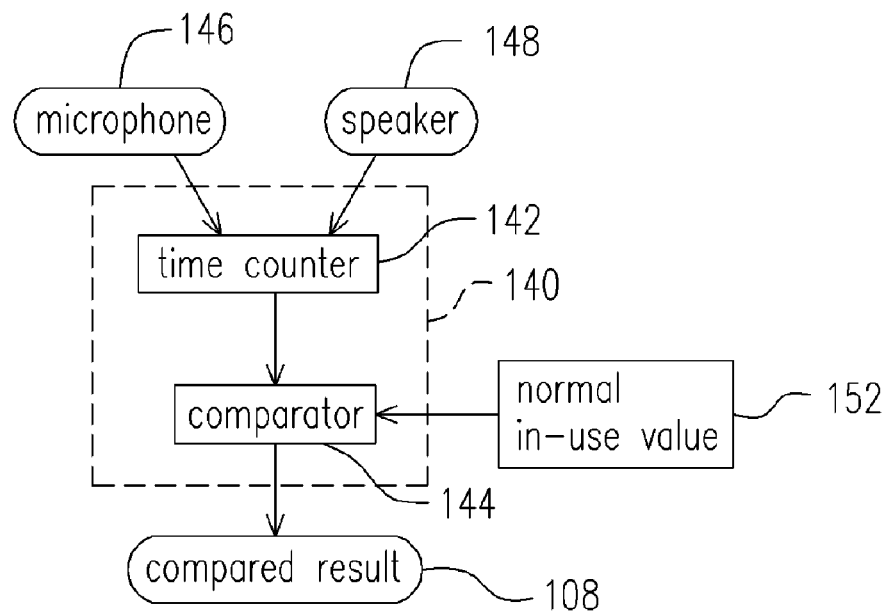
FIG. 3 is a block diagram of a audio monitor in accordance with an embodiment of the present invention.

FIG. 3 is a block diagram of the audio monitor in accordance with an preferred embodiment of the present invention. The audio monitor 140 includes an audio sampling device 142 and a comparator 144. The microphone 146 and the speaker 148 of the telephone system 100 (shown in FIG. 1) are adapted for inputting the audio signal into the audio monitor 140. The audio sampling device 142 is adapted for sampling the audio signal and outputting the sampling result to the comparator 144. The comparator 144 is adapted for comparing the sampling result with the normal in-use value 152 to determine whether the telephone system 100 is in the normal use state and then outputs the compared result 108. If the telephone system 100 is still in the normal use state, a reset signal 104 will be sent to the timer 130 (shown in FIG. 2) so that the timer 130 can restart to count the in-use time. If the telephone system 100 is not in the normal use state, then the spring circuit 112 (shown in FIG. 1) will be checked to determine whether the spring circuit 112 is in the off-hook state, and the timer 130 continues to count the in-use time.

Figure 4:
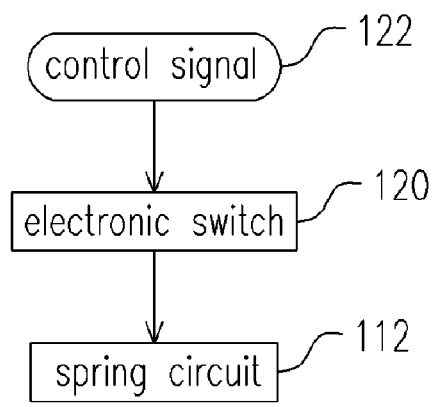
FIG. 4 is a block diagram of an electronic switch in accordance with an embodiment of the present invention.

FIG. 4 is a block diagram of the electronic switch in accordance with an embodiment of the present invention. The electronic switch 120 is adapted for receiving the control signal 122 and switching the spring circuit 112 from the off-hook state to the on-hook state.

Figure 5:
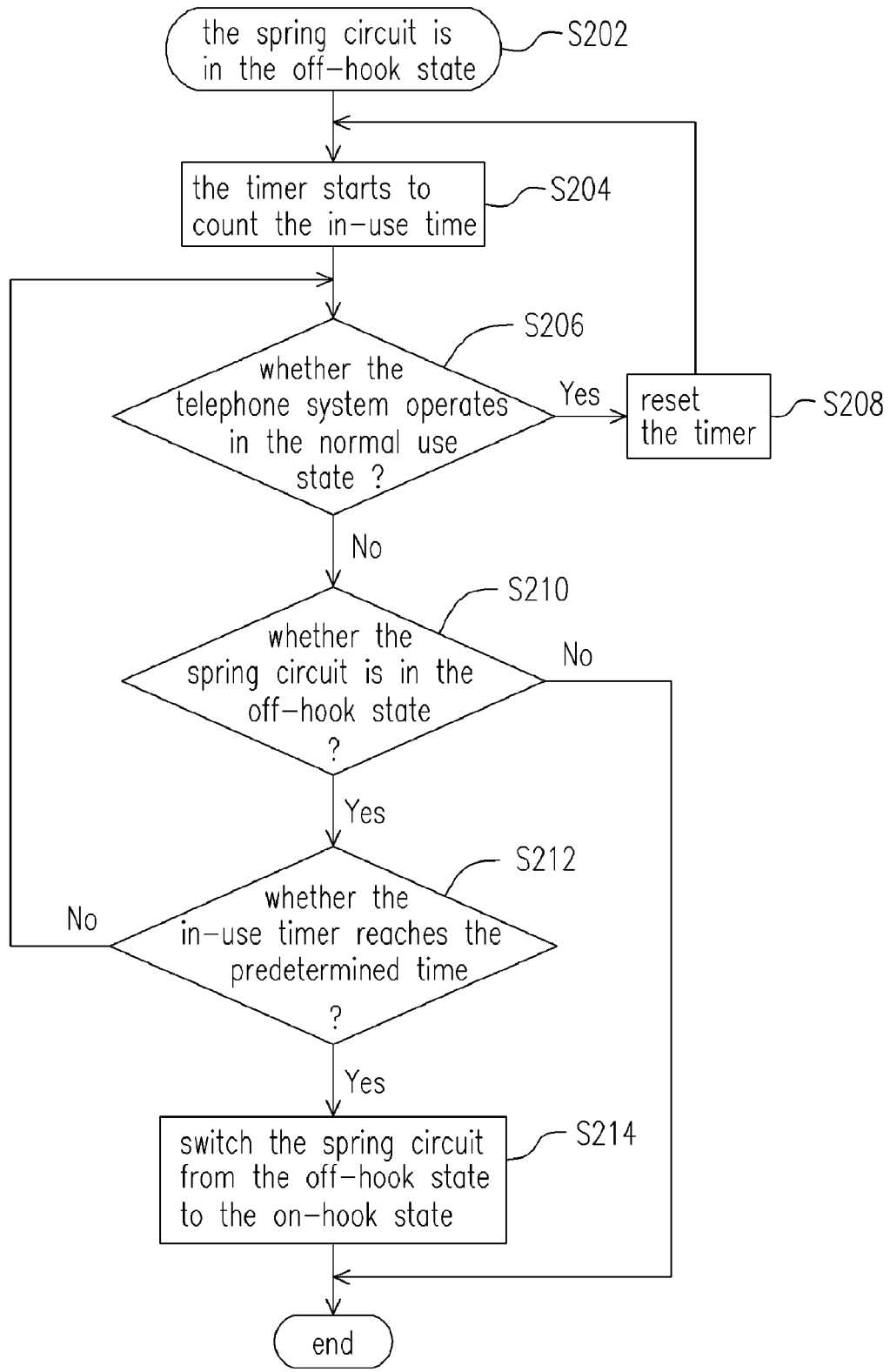
FIG. 5 is a flow chart for automatically keeping in an on-hook state in accordance with an embodiment of the present invention.

FIG. 5 is a flow chart for automatically switching an on-hook state in accordance with an embodiment of the present invention. This method for automatically switching to an on-hook state is suitable for a telephone system such as the telephone system in FIG. 1. When the spring circuit 112 is in the off-hook state (S202), the timer 130 starts to count the in-use time (S204). Then the audio monitor 140 monitors the telephone system 100 to determine whether the telephone system 100 operates in the normal use state (S206). If the telephone system 100 operates in the normal use state, the reset signal will be sent to the timer 130 so that the timer 130 can reset and restart to count the in-use time (S208).

Referring to FIG. 5, if the telephone system 100 operates under an abnormal use state, the timer 130 continues to count the in-use time. Then the spring circuit 112 will be checked to determine whether it is in the off-hook state (S210). If the spring circuit 112 is not in the off-hook state, it is in the on-hook state and the method ends. If the spring circuit 112 is in the off-hook state, the in-use time counted by the timer 130 will be checked to determine whether the in-use timer reaches the predetermined time (S212). If not, the method goes back to S206 and the timer 130 continues to accumulate the in-use time. If the in-use timer reaches the predetermined time, a control signal will be generated and sent to the electronic switch 120 (S214) to switch the switch the spring circuit 112 from the off-hook state to the on-hook state and then the method ends.

In light of the above, the method for automatically switching to an on-hook state, according to an embodiment of the present invention, the spring circuit can be automatically switched to the on-hook state when the spring circuit of the telephone system is maintained in the off-hook state for an unreasonably long time. Accordingly, the spring circuit can be switched to the on-hook state if the telephone does not operate in the normal use state for a predetermined time. Therefore, the telephone system can be switched back to the on-hook state when the mouthpiece is unintentionally off the hook so that missing the phone call can be avoided.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A automatic on-hook telephone system, comprising:
   a telephone, having a spring circuit;
   an audio monitor, coupled to said telephone, for monitoring said telephone system to determine whether said telephone system is operating in a normal use state;
   a timer, coupled to said telephone, for counting a time of said telephone operating in an abnormal use state and generating a control signal when said time is longer than a predetermined time; and
   an electronic switch, coupled to said telephone, for switching said spring circuit to said on-hook state in response to said control signal.

2. The automatic on-hook telephone system of claim 1, wherein audio monitor samples an audio signal for monitoring said telephone system to determine whether said telephone system is operating in said normal use state.

3. A automatic on-hook telephone system, comprising:
   a telephone, having a spring circuit;
   an audio monitor, coupled to said telephone, for monitoring said telephone system to determine whether said telephone system is operating in a normal use state; and
   an electronic switch, coupled to said telephone, for switching said spring circuit to an on-hook state when said telephone system is operating in an abnormal use state.

4. The automatic on-hook telephone system of claim 3, wherein said audio monitor samples an audio signal for monitoring said telephone system to determine whether said telephone system is operating in said normal use state.

5. The automatic on-hook telephone system of claim 3, further comprising:
   a timer, coupled to said telephone, for counting a time of said telephone system operating in said abnormal use state and generating a control signal when said time is longer than a predetermined time, wherein said electronic switch switches said spring circuit to said on-hook state in response to said control signal.

* * * * *